Dec. 19, 1933.  T. BROWN  1,939,950
TRACTOR
Filed July 20, 1931   2 Sheets-Sheet 1

INVENTOR.
Theophilus Brown
BY Brown, Jackson
Boettcher & Diemer
ATTORNEYS.

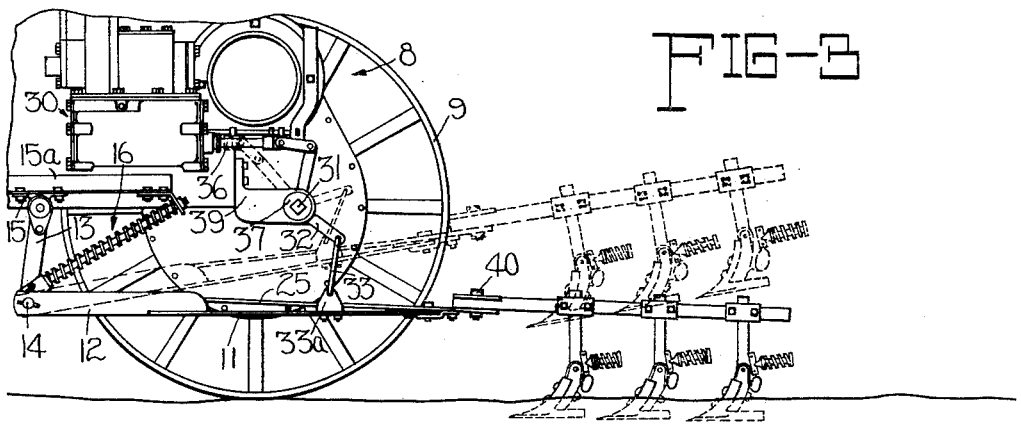
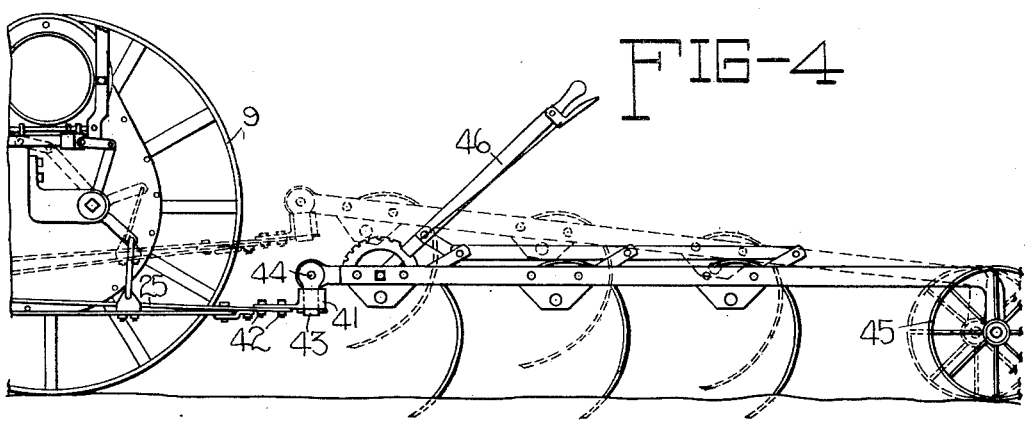
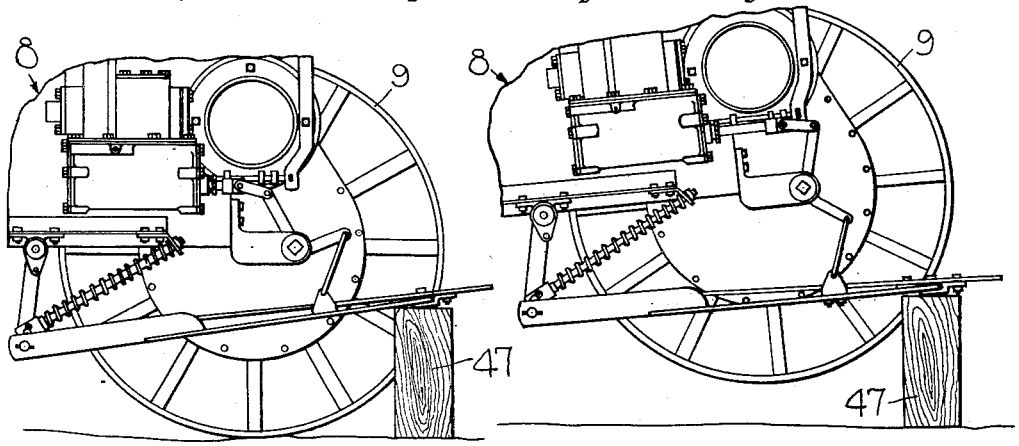

Patented Dec. 19, 1933

1,939,950

UNITED STATES PATENT OFFICE 1,939,950

TRACTOR

Theophilus Brown, Moline, Ill., assignor to Deere & Company, Moline, Ill., a corporation of Illinois Application July 20, 1931. Serial No. 551,848

1 Claim. (Cl. 280—33.44)

The present invention relates to improvements in tractors, and more particularly has to do with the provision of an improved drawbar construction therefor. As is well known, tractors are frequently used on farms and in other situations to draw various types of implements or other loads, such loads usually being connected with the tractor through the medium of a drawbar comprising a rigid structure pivotally connected with the tractor and with the implement or load. Owing to the rigid drawbar construction it was not only desirable, but practically necessary, to provide each implement that was to be drawn by a tractor with a spring cushioning hitch device, so that such hitch device would yield rearwardly under an abnormal load, such, for instance, should the implement strike an obstruction, or be slowed up on account of soil conditions, thereby preventing breakage of parts which might otherwise occur. Providing each implement that is to be connected to a tractor with such a spring cushioning hitch device is objectionable as it increases the cost of manufacture of the inplement, thereby increasing the cost to the ultimate purchaser.

The principal object of my present invention, therefore, is to provide a device which will overcome the above noted objection, and this is accomplished by providing a drawbar pivotally connected with the rear end of the tractor and having spring cushioning mechanism incorporated therein whereby the said drawbar may yield rearwardly under abnormal loads, thereby making it unnecessary to provide each implement that is adapted to be connected to a tractor with a spring cushioning hitch device.

Another object of my present invention is to provide means for connecting the rear portion of said drawbar with hydraulic lift mechanism on the tractor whereby implements of various types may be mounted directly on the drawbar or directly connected therewith so that such implements may be raised and lowered, or adjusted as to depth, by means of such hydraulic lift mechanism.

A further object of my present invention is to provide such a drawbar construction for a tractor having a hydraulic lift mechanism whereby said drawbar and lift mechanism may be utilized as a hydraulic jack to lift the rear end of the tractor off of the ground.

Other objects and advantageous features will be apparent from the following description of the preferred embodiment of my invention illustrated in the accompanying drawings, in which:

Figure 3 is a view similar to Figure 2 showing a cultivating rig rigidly mounted directly on the rear end of the drawbar of the tractor, whereby such rig may be adjusted and also raised and lowered by the operation of the hydraulic lift mechanism;

Figure 4 is a view similar to Figure 3 illustrating a spring tooth harrow pivotally connected to the rear end of the drawbar;

Figure 1:
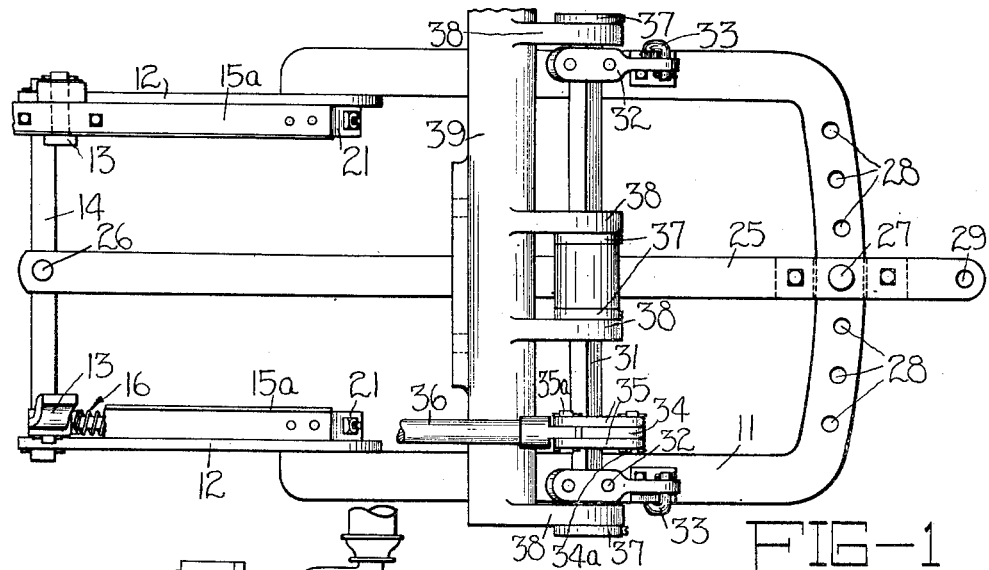
Figure 1 is a top plan view illustrating my improved drawbar construction and a portion of its connections with the hydraulic lift mechanism.

Figure 5 is a side elevation illustrating the use of the drawbar and hydraulic lift mechanism as a power operated jack and illustrating the position of the parts before the rear end of the tractor is raised by means of the power lift mechanism after a block has been inserted under the drawbar; and Figure 6 is a view similar to Figure 5 illustrating the position of the parts after the rear end of the tractor has been raised off of the ground by the hydraulic lift mechainism.

Referring to the drawings, the tractor, the rear portion of which is fragmentarily illustrated in Figures 2 to 6, is indicated as an entirety by the reference numeral 8, and the rear traction wheels are indicated by the numeral 9. The drawbar of the present invention comprises a flat U-shaped member 11, the forward portions 12 of the side arms of which are twisted to a position of 90° from the main body portion thereof, whereby such forward portions 12 extend in vertical planes as shown. These forward portions 12 of the drawbar are pivotally connected at their forward ends to depending links 13 by means of a transversely extending pivot shaft 14, which pivot shaft forms the pivot bearings between the two members 12 and their respective links 13, as clearly shown in Figure 1. The links 13 are pivotally suspended at their upper ends from brackets 15 bolted or otherwise suitably secured to rails 15a provided along each side of the tractor (see Figure 1).

Figure 2:
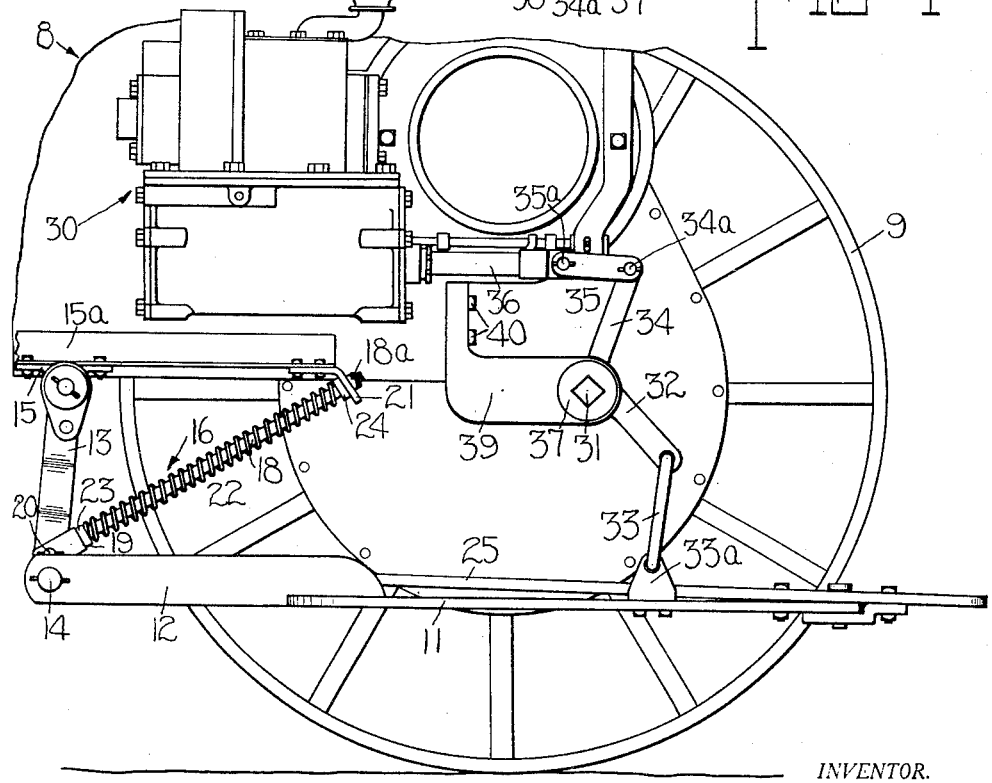
Figure 2 is a side elevation illustrating the rear end of a tractor equipped with my improved drawbar.

The drawbar 11 is provided with two spring cushioning devices 16, one on each side of the tractor, and as such devices are alike in structure a description and illustration of but one of them will suffice. As best shown in Figure 2, each spring cushioning device comprises a rod 18 secured at its forward end to a bracket 19 pivotally connected at 20 with the link 13 adjacent the lower end thereof. The rod 18 extends upwardly and rearwardly from this pivotal connection with the link 13, and the rear end of said rod projects through a perforation in a bracket 21 bolted or otherwise suitably secured to the rear end of the rail 15a. A nut 18a on the screw threaded upper end of the rod 18 on the opposite side of the bracket 21 holds said rod in position in said bracket. A compression spring 22 embraces the rod 18, the ends of said spring bearing against washers 23 and 24 mounted on said rod and bearing against the brackets 19 and 21, respectively. By this construction, therefore, the drawbar 11 may yield rearwardly under an abnormal load, as the links 13 will swing about their pivotal connections with the brackets 15 thereby permitting the drawbar to move rearwardly, such rearward movement merely compressing the spring 18, as will be readily understood.

As shown in Figure 1, the drawbar also comprises a longitudinally extending flat bar or member 25 positioned midway between the arms of the member 11 and pivotally connected at its forward end with the pivot shaft 14 by means of a pivot stud 26, whereby the rear end of said bar 25 may be swung laterally relatively to the member 11 about the pivot stud 26 as a center, as is usual in drawbar constructions. The rear end portion of the bar 25 rests on the upper surface of the base portion of the U-shaped member 11, and said bar 25 is adapted to be locked to said member 11 in any laterally adjusted position by means of a pin 27 extending through a perforation in said bar 25 and any one of a number of perforations 28 provided in the member 11, as will be readily understood. To provide means for connecting the drawn implements to the tractor the member 25 of the drawbar is extended rearwardly beyond the member 11 and provided with one or more perforations 29, whereby the drawn implement or load may be pivotally connected with the drawbar by a bolt, clevis, or other suitable means.

The rear end of the drawbar is supported through suitable connections with the hydraulic lift mechanism which mechanism is indicated as a whole by the reference numeral 30. As this lift mechanism may be of any well known type such as is commonly employed in farm tractors, such as the lift mechanism disclosed in the copending application of Harold Brown, Serial No. 503,887, filed December 22, 1930, a detailed description thereof is unnecessary, and it will suffice to say that such mechanism is operated by power derived from the tractor motor and includes a reciprocable piston whose movements can be controlled by the operator.

The several connections between the drawbar and the hydraulic lift mechanism include a rock shaft 31 extending transversely across the tractor as shown in Figure 1 and supported thereon as hereinafter described. Fixed to said rock shaft so as to turn therewith and extending therefrom is a pair of arms 32, one of said arms being provided adjacent each end of the rock shaft in the vertical plane of the adjacent side arm or member of the U-shaped drawbar 11 as shown in Figure 1. Pivotally connected with the outer end of each of the arms 32 is a link 33.

Each link 33 extends downwardly from its pivotal connection with its companion arm 32 and is pivotally connected at its lower end with a bracket 33a bolted or otherwise suitably secured to the adjacent side arm of the member 11 of the drawbar, as clearly shown in Figures 1 and 2. Fixed to the rock shaft 31 and extending upwardly therefrom is an arm 34. The upper end of the arm 34 is pivotally connected by a pivot pin 34a between a pair of spaced links 35, and the opposite ends of said spaced links are pivotally connected by a pivot pin 35a with the piston rod 36 of the hydraulic lift mechanism, as clearly shown in Figures 1 and 2.

For mounting the rock shaft 31 on the tractor, said shaft is provided with suitable spaced bearings 37 (see Figure 1) journaled in perforations in the ends of arms 38 extending rearwardly from a transversely extending supporting member 39 suitably fixed to the tractor frame by bolts 40 or any other appropriate means.

It should be particularly noted that by providing the links 33 with their pivotal connections with the arms 32 and brackets 33a extending in a horizontal plane, the connecting means between the drawbar and the hydraulic lift mechanism will not interfere with the rearward yielding movement of said drawbar under abnormal load conditions, this being true no matter what the position of such connecting means may be, whether in upper or lower position.

In Figure 3 of the drawings I have illustrated a cultivator rig mounted directly on the drawbar of the tractor to illustrate the manner in which the raising and lowering of the drawbar under the control of the hydraulic lift mechanism may be utilized to adjust the operating depth of the attached implement, as well as raising and lowering the cultivator rig by such mechanism. In this construction the forward end of the rig beam is rigidly secured to the end of the member 25 of the drawbar by means of a bolt 40 inserted through a perforation in the beam and through the perforation 29 in the member 25. In this figure I have illustrated in full lines the positions of the parts when the cultivating shovels are in operating position and in dotted lines the positions of the parts when the rig is raised to inoperative position.

In Figure 4 I have illustrated a spring tooth harrow pivotally connected at its forward end with the rear end of the member 25 of the drawbar and carried upon supporting wheels at its rear end. The connections between the harrow and the drawbar in this construction include a bracket 41 secured to the rear end of the member 25 of the drawbar by means of two bolts 42. The bracket 41 is provided with a vertical bore for receiving a pin 43 to the upper end of which the front end of the harrow frame is pivotally connected by a horizontally extending pivot pin 44. The depth of operation of the spring teeth of the harrow may be adjusted by means of the hand lever 46. When the harrow is raised to inoperative position by power lift, the frame of the harrow pivots on the axle of the wheel 45 and also on the pin 44, as will be readily understood. The positions of the various parts when the harrow is in operating position are shown in full lines, and their positions when the harrow is in inoperative position are shown in dotted lines.

In Figures 5 and 6 I have illustrated the manner in which the drawbar and hydraulic lift mechanism may be used as a jack to lift the rear end of the tractor, which is sometimes desirable, as for instance when it is desired to change the tread of the tractor by reversing the wheels, or for any other purpose. This may readily be accomplished by first raising the drawbar by means of the hydraulic lift mechanism, then inserting a block 47 under the rear end of the drawbar, after which the hydraulic lift mechanism is reversed to lower the drawbar, but as such drawbar is held against downward movement by the block 47 the rear end of the tractor will move upwardly under the action of the hydraulic lift mechanism, as will be readily understood.

So far as I am aware, it is broadly new to provide a longitudinally yieldable drawbar arranged to connect various implements to a tractor, whereby the necessity of providing a yielding hitch device between such implements and the drawbar is made unnecessary; also to provide means for raising and lowering the drawbar by hydraulic lift mechanism mounted on the tractor and deriving power from the tractor motor, whereby various types of implements may be directly connected with the drawbar so that such implements through their connection with the drawbar may be raised and lowered by the hydraulic lift mechanism on the tractor, and the appended claim is therefore to be construed accordingly.

I claim:

The combination with a tractor, of a drawbar comprising a U-shaped member having substantially parallel forwardly extending arms, a link pivotally connecting the forward end of each of said arms with the tractor, a pair of spaced brackets carried by the tractor rearwardly of said link means, yielding means interposed between the forward portions of said arms and said brackets for cushioning the rearward movement of said drawbar, and a separate link means supporting the rear portion of said drawbar from the tractor, both of said link means extending substantially vertically when in normal position and disposed in substantial parallelism, whereby said drawbar moves longitudinally with substantially translatory movement.

THEOPHILUS BROWN.